United States Patent
Yanagida et al.

(10) Patent No.: US 7,349,347 B2
(45) Date of Patent: Mar. 25, 2008

(54) ASK COMMUNICATION DEVICE

(75) Inventors: Yo Yanagida, Shizuoka (JP); Naoyuki Shiraishi, Shizuoka (JP); Atsushi Kawamura, Shizuoka (JP); Terumitsu Sugimoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 397 days.

(21) Appl. No.: 11/190,978

(22) Filed: Jul. 28, 2005

(65) Prior Publication Data

US 2006/0023734 A1    Feb. 2, 2006

(30) Foreign Application Priority Data

Jul. 29, 2004    (JP)    ............... 2004-221798

(51) Int. Cl.
*H04J 1/16*    (2006.01)
*H04J 3/14*    (2006.01)

(52) U.S. Cl. .............. 370/252; 370/311; 370/401; 370/438; 370/467; 375/261; 375/268; 455/86; 455/296; 455/450

(58) Field of Classification Search ........... 370/252, 370/311, 438, 467; 375/261, 268; 455/86, 455/296, 450
See application file for complete search history.

(56) References Cited

U.S. PATENT DOCUMENTS

2007/0025738 A1*    2/2007    Moore ................... 398/189

FOREIGN PATENT DOCUMENTS

JP    2002-152291    5/2002

* cited by examiner

*Primary Examiner*—Jean Gelin
*Assistant Examiner*—Inder Pal Mehra
(74) *Attorney, Agent, or Firm*—Finnegan, Henderson, Farabow, Garrett & Dunner, L.L.P.

(57) ABSTRACT

An ASK communication device includes a master station and slave stations connected to the master station through a bus line. The master station includes a transmission unit for ASK-modulating a carrier signal outputted from an oscillation circuit owned thereby and outputting, to a bus line, ID signals of the respective stations and data transmitted to the respective slave stations in a case of transmitting the data from the master station, and outputting the ID signal of the slave station as a transmission source and the carrier signal to the bus line in a case of transmitting the data from the slave station, and a master-side reception unit for receiving, through the bus line, the data transmitted from the slave station. The at least one slave station includes a slave-side reception unit for receiving the data transmitted from the master station and other slave stations, and an attenuation unit for attenuating and ASK-modulating the carrier signal outputted from the master station to the bus line.

4 Claims, 10 Drawing Sheets

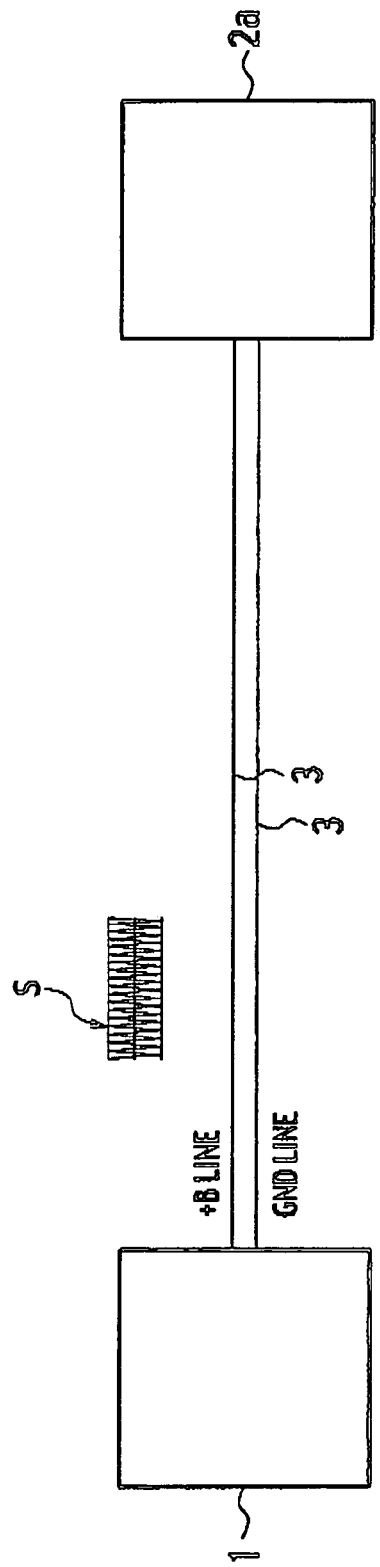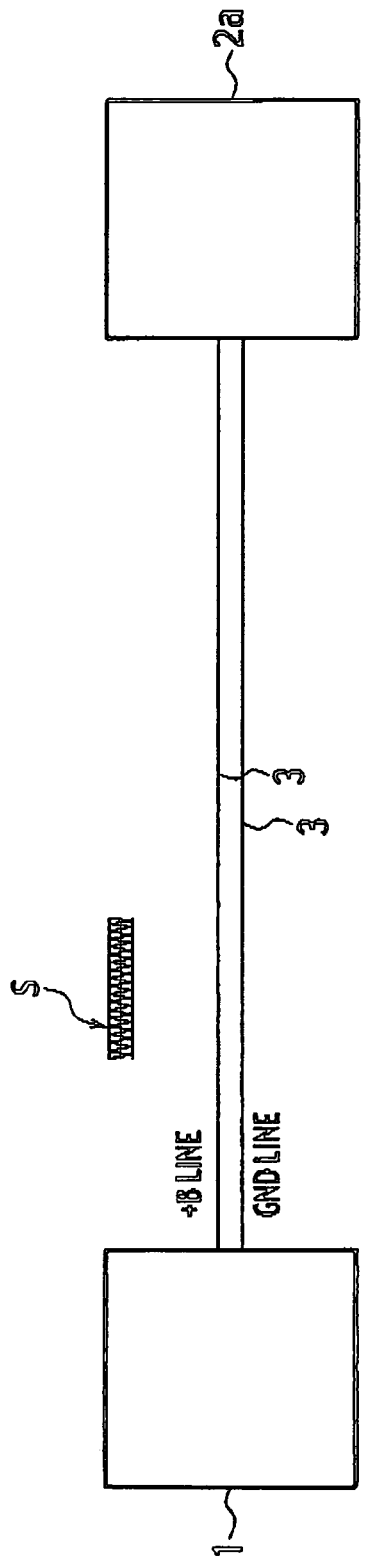

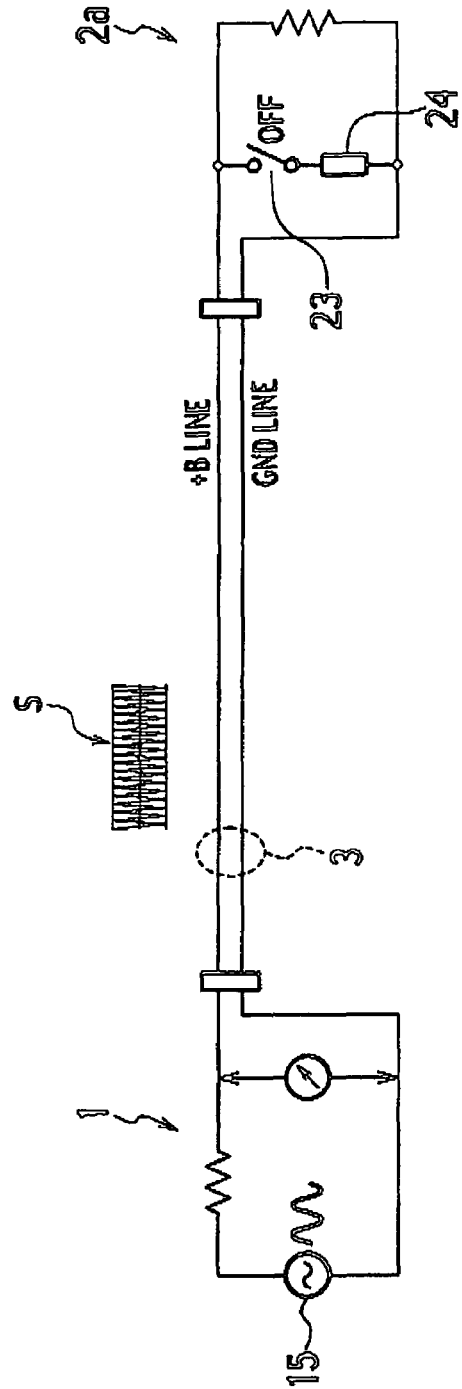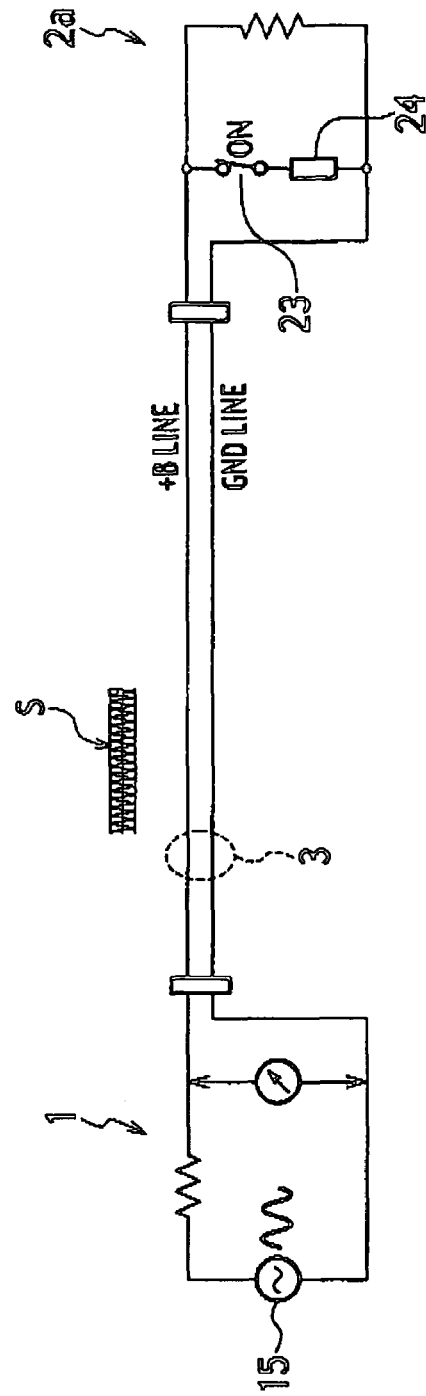

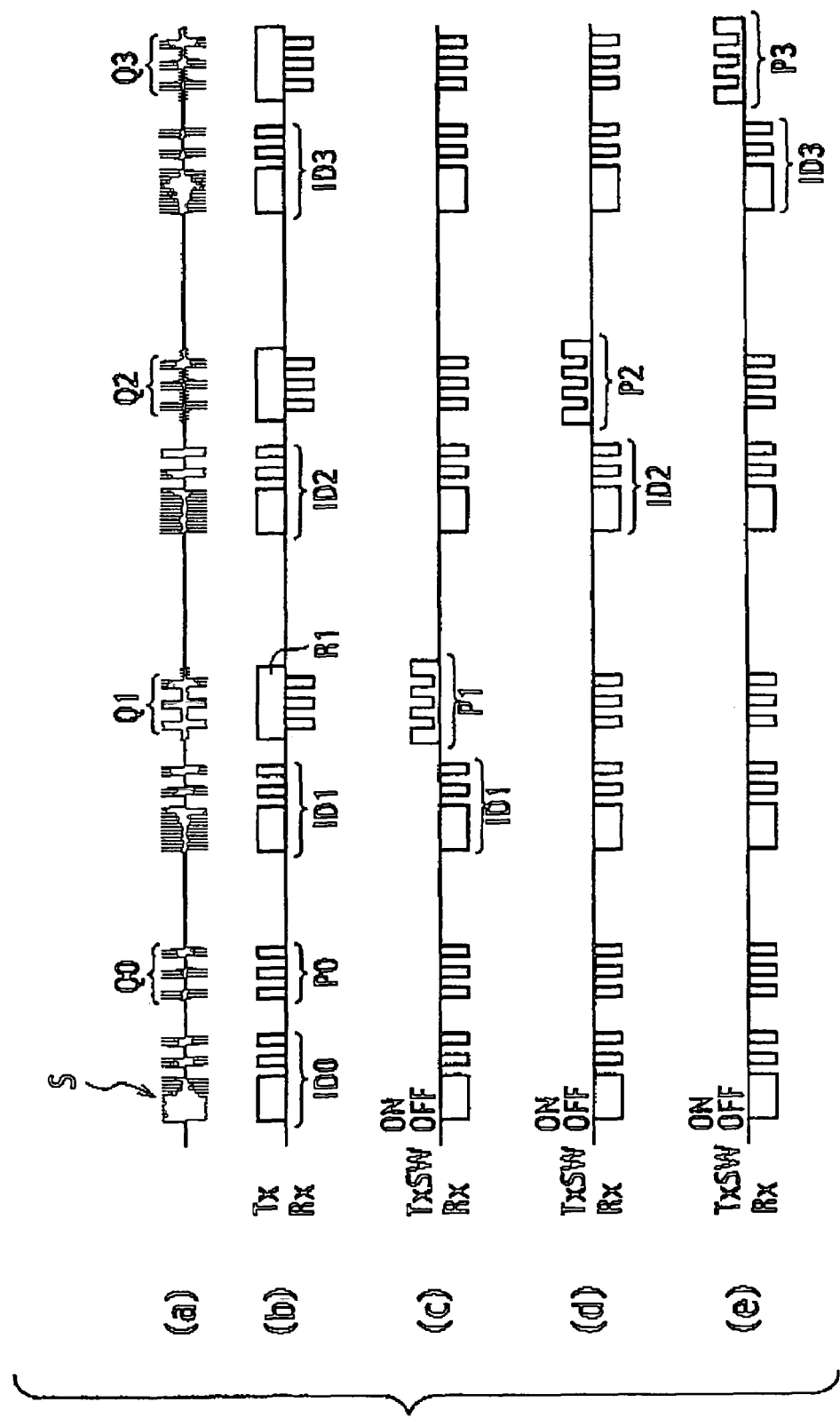

ASK COMMUNICATION DEVICE

BACKGROUND OF THE INVENTION

1. Field of the Invention

The present invention relates to an ASK communication device for making data communication between a master station and at least one slave station by using an ASK (Amplitude Shift Keying) mode.

2. Description of the Related Art

A communication mode using an ASK mode is known as a mode of connecting a master station and slave stations through bus lines and making data communication among the respective stations (refer to Japanese Patent Laid-Open Publication No. 2002-152291).

FIG. 1 is a timing chart showing timing of transmitting and receiving data in a conventional communication mode using the ASK. A horizontal axis direction represents a time base. A vertical axis direction in FIG. 1(a) represents amplitude of a carrier signal S superposed on the bus line. The vertical axis direction in FIG. 1(b) represents the transmission/reception timing of the data in the master station. The vertical axis direction in FIGS. 1(c) to 1(e) represents the transmission/reception timing of the data in three slave stations. Moreover, reference symbols Tx and Rx shown in FIG. 1 denote transmission and reception, respectively. The master station has ID0 as an ID thereof, and the three slave stations individually have IDs 1 to 3 as IDs thereof.

As shown in FIG. 1(a), the master station outputs ID data of a station serving as a transmission source, and when the ID0 as the ID of the master station is designated, outputs, to the bus line, communication data transmitted therefrom to each slave station. Moreover, as shown in FIGS. 1(c) to 1(e), when the communication data is outputted from, each slave station to the bus line, the master station receives the communication data thus outputted.

Moreover, as shown in FIG. 1(c), when the slave station having the ID1 is designated by the master station, the communication data transmitted by the slave station of the ID1 to the other slave stations and the master station is outputted to the bus line.

In a similar way, in FIGS. 1(d) and 1(e), transmission data is outputted to the bus line from the slave stations of the ID2 and the ID3. By such operations, the data communication can be sequentially made among the master station and the respective slave stations.

SUMMARY OF THE INVENTION

However, in the conventional ASK mode, it is necessary for the master station and the respective slave stations to individually include oscillation circuits. Such an oscillation circuit requires an expensive component such as a crystal oscillator, a ceramic oscillator and a PLL circuit. Accordingly, there occurs a problem that the entire apparatus is enlarged in scale, leading to a cost increase thereof.

It is an object of the present invention to provide an ASK communication device capable of reducing a circuit scale and achieving a cost reduction.

In order to achieve the above-described object, a feature of the present invention is summarized in that an ASK communication device for making data communication among respective stations by using an ASK mode includes: a master station; and at least one slave station connected to the master station through a bus line, wherein the master station includes: an oscillation circuit for outputting a carrier signal with a desired frequency; a transmission unit for ASK-modulating the carrier signal outputted from the oscillation circuit and outputting, to the bus line, ID signals identifying the respective stations and data transmitted to the slave station in a case of transmitting the data from the master station, and outputting the ID signal of the slave station serving as a transmission source and the carrier signal to the bus line in a case of transmitting data from the slave station; and a master-side reception unit for receiving the data transmitted from the slave station through the bus line, and the slave station includes: a slave-side reception unit for receiving the data transmitted from the master station and another slave station; and an attenuation unit for attenuating the carrier signal outputted from the master station to the bus line and generating an ASK modulation signal in a case of transmitting the data from the slave station.

According to the feature of the present invention, when the slave station transmits the data, the carrier signal is outputted to the bus line by the oscillation circuit provided in the master station, and the amplitude of the carrier signal is attenuated by using the attenuation unit provided in the slave station. In such a way, the carrier signal can be ASK-modulated, and the transmission data can be outputted to the other slave station and the master station. Accordingly, it is not necessary for the respective slave stations to include the oscillation circuits, the circuit scale can be reduced, and the cost reduction can be achieved.

The attenuation unit may be formed of a transmission switch and a signal attenuation unit, both of which are interposed between two electrical wires constituting the bus line, and the carrier signal superposed on the bus line may be switched attenuation and non-attenuation by switching the transmission switch conduction and cutoff.

With the above-described configuration, the attenuation unit is formed of the transmission switch and the signal attenuation unit, and the carrier signal superposed on the bus line can be switched attenuation and non-attenuation by operating the transmission switch to switch on/off. Accordingly, on the slave station side, the ASK modulation signal can be generated by a simple operation.

The signal attenuation unit may comprise at least one of a resistor, a coil, a capacitor, a parallel-connected circuit of a coil and a capacitor, and a serially-connected circuit of a resistor and a coil.

With the above-described configuration, the signal attenuation unit comprises a simple element such as the resistor, the coil and the capacitor, and accordingly, simplification of the circuit configuration can be achieved.

The bus line may be a power line for supplying a power supply voltage to the master station and the slave station.

With the above-described configuration, the power line for supplying drive power to the master station and the slave station is used as the bus line for the communication, and accordingly, ASK communication that does not require the dedicated line is enabled, and in addition, the circuit configuration can be simplified.

BRIEF DESCRIPTION OF THE DRAWINGS

FIGS. 5A and 5B are explanatory views showing examples of expressing a "0" signal and a "1" signal by means of amplitude of a carrier signal S according to the embodiment of the present invention.

FIGS. 7A and 7B are explanatory views showing the "0" signal and the "1" signal in a case of transmitting the data from the slave station ECU to the master station ECU according to the embodiment of the present invention.

FIGS. 8(a) to 8(e) are timing charts showing transmission/reception timing of the master station ECU and the respective slave station ECUs according to the embodiment of the present invention.

FIG. 9A is a block diagram; and FIG. 9B is a circuit diagram.

DETAILED DESCRIPTION OF THE PREFERRED EMBODIMENT

Figure 1:
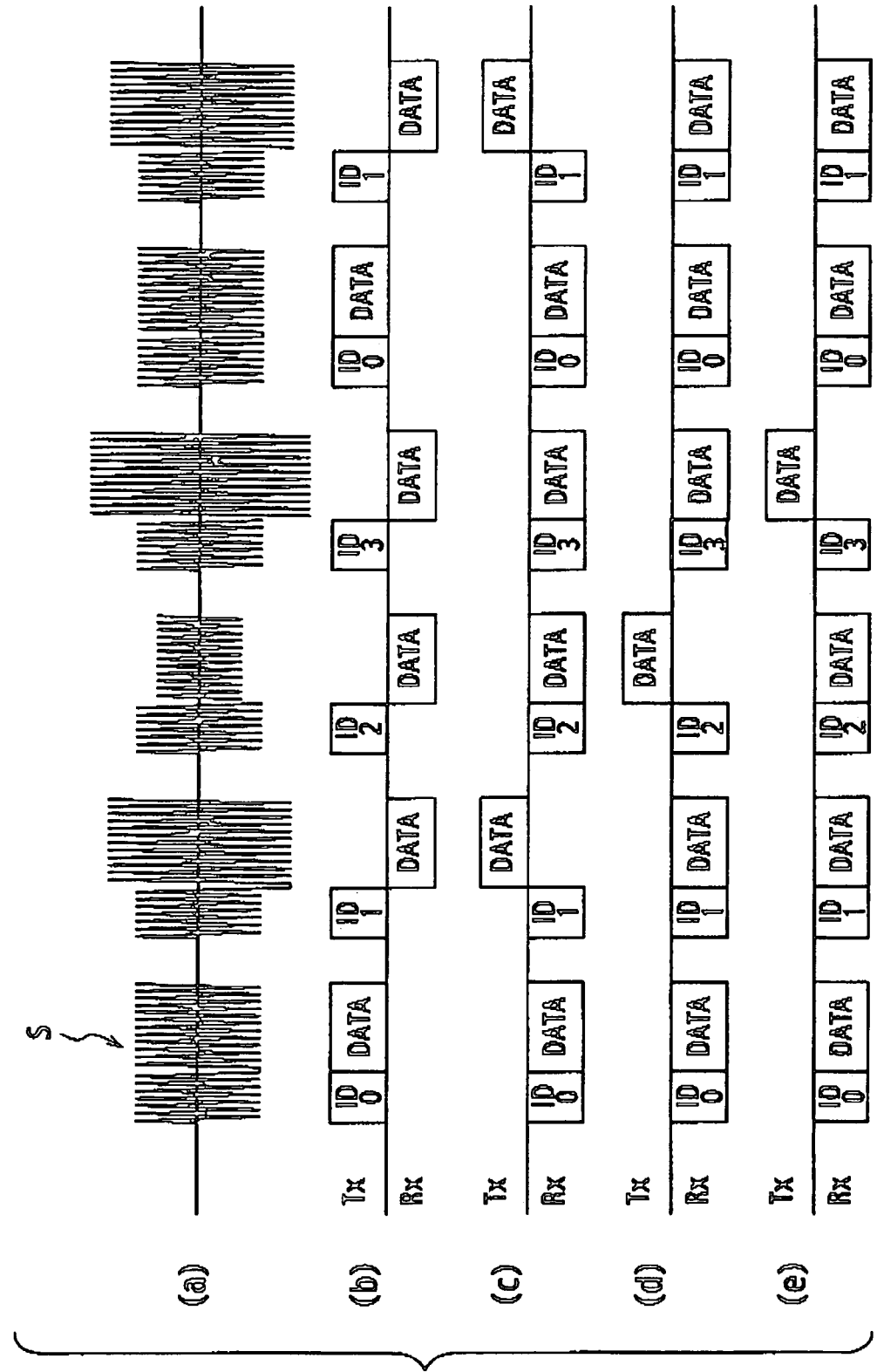
FIGS. 1(a) to 1(e) are timing charts showing transmission/reception timing of a master station and respective slave stations in conventional communication using an ASK mode.

An embodiment of the present invention is described below based on the drawings. In the following description based on the drawings, the same or similar reference numerals are assigned to the same or similar portions.

Figure 2:
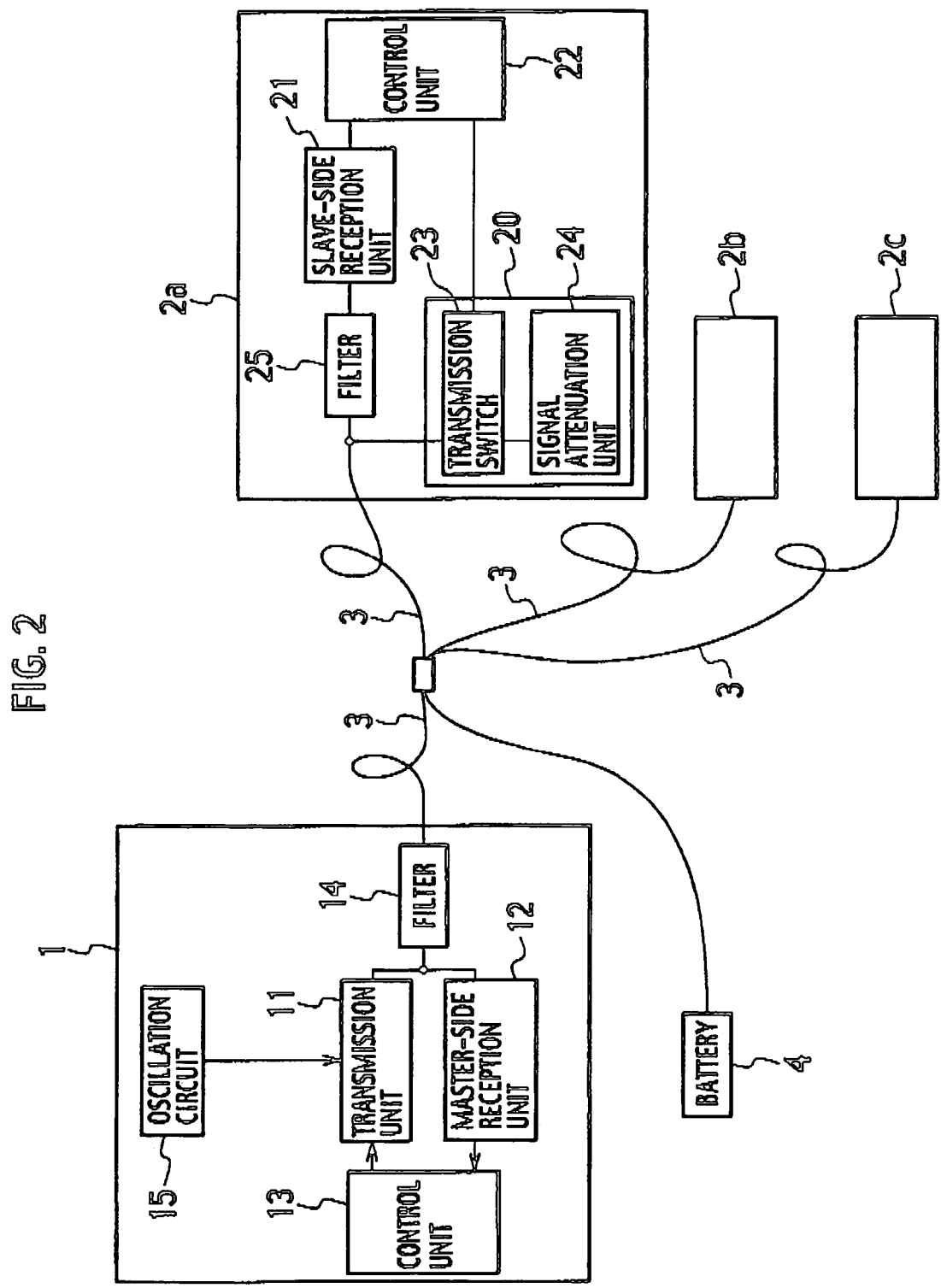
FIG. 2 is a block diagram showing a configuration of an ASK communication device according to an embodiment of the present invention.

FIG. 2 is a block diagram showing a configuration of an ASK communication device according to an embodiment of the present invention. As shown in FIG. 2, the ASK communication device makes communication among an ECU (Electrical Control Unit) 1 serving as a master station and three ECUs 2a to 2c serving as slave stations by using an ASK mode. In this embodiment, description is made of the case of using a PLC (Power line Communication) mode, in which power lines are provided between a battery 4 and the respective ECUs 1 and 2a to 2c provided in a vehicle, communication signals are superposed on the power lines for supplying drive power to the respective ECUs, and data communication is made among the respective ECUs without including dedicated communication lines. Specifically, the power lines are used as bus lines 3 for making the data communication among the respective ECUs.

Moreover, FIG. 2 shows the case of using the ASK communication device for in-door communication of the vehicle. For example, the slave station ECU 2a controls a door lock, the slave station ECU 2b controls a power window, and the slave station ECU 2c controls a door mirror. Moreover, the ECU 1 serving as the master station controls an operation switch.

As shown in FIG. 2, the master station ECU 1 includes an oscillation circuit 15, a transmission unit 11 for ASK-modulating a carrier signal S with a desired frequency, which is outputted from the oscillation circuit 15, and outputting transmission data to the bus lines 3, a master-side reception unit 12 for receiving the data transmitted through the bus lines 3 and ASK-demodulating the received data, a control unit 13 for controlling the transmission unit 11 and the master-side reception unit 12, and a filter 14 provided on an output side of the transmission unit 11 and an input side of the master-side reception unit 12 for removing a signal in an unnecessary frequency band.

Each of the slave station ECUs 2a to 2c includes a slave-side reception unit 21 for receiving and ASK-demodulating the data transmitted through the bus line 3, a filter 25 provided on an input side of the slave-side reception unit 21 for removing the signal in the unnecessary frequency band, a signal attenuation unit 24 for attenuating the carrier signal S superposed on the bus line 3, a transmission switch 23 for switching on/off of the signal attenuation unit 24, and a control unit 22 for controlling the transmission switch 23 and the slave-side reception unit 21. Note that FIG. 2 shows a detailed configuration of only the slave station ECU 2a. Each of the slave station ECUs 2b and 2c has a similar configuration to that of the slave station ECU 2a, and accordingly, description of the respective constituents thereof is omitted. Moreover, an attenuation unit comprises the transmission switch 23 and the signal attenuation unit 24.

Figure 3:
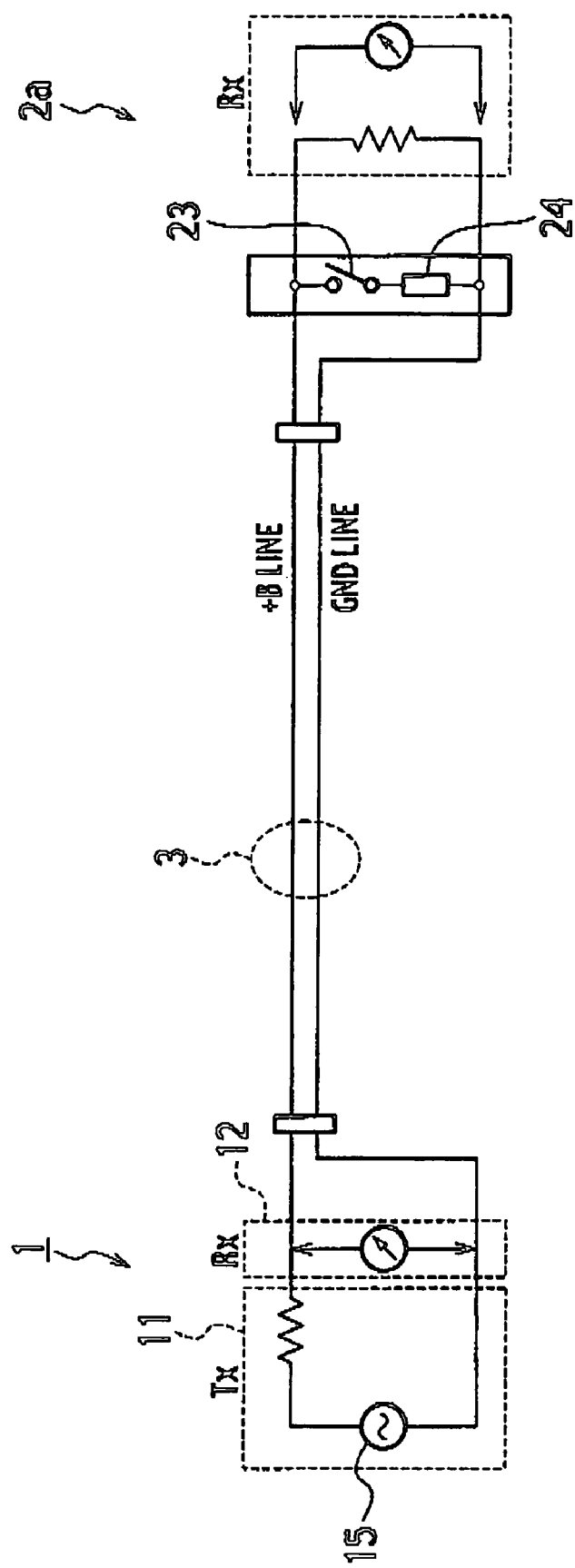
FIG. 3 is an explanatory view showing a configuration in which an ECU serving as the master station and an ECU serving as the slave station are connected to each other by using a power line in the ASK communication device according to the embodiment of the present invention.

FIG. 3 is an explanatory view showing details of a coupling state of the master station ECU 1 and the slave station ECU 2a. Reference symbols Tx and Rx denote transmission and reception, respectively. As shown in the drawing, the power line as the bus line 3 includes a +B line turning to the positive polarity, and a ground line turning to the negative polarity. The power line superposes the carrier signal S having a predetermined frequency on the +B line, and changes amplitude of the carrier signal S. In such a way, the power line generates signals expressing "1" and "0", and makes the data communication between the master station ECU 1 and the slave station ECU 2a.

Moreover, as shown in FIG. 3, the transmission switch 23 and the signal attenuation unit 24 provided in the slave station ECU 2a are interposed between the +B line and the ground line. When the transmission switch 23 is switched on, the +B line and the ground line are coupled to each other through the signal attenuation unit 24. On the other hand, when the transmission switch 23 is switched off, this coupling is cut.

Figure 4A:
FIGS. 4A to 4F are circuit diagrams each showing a specific example of a signal attenuation unit according to the embodiment of the present invention.
Figure 4B:
Figure 4C:
Figure 4D:
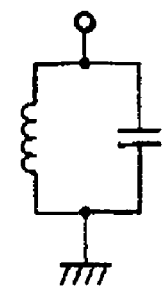
Figure 4E:
Figure 4F:
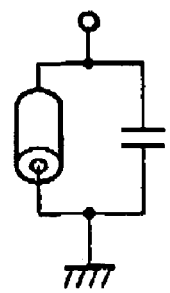

The signal attenuation unit 24 just needs to be provided between the +B line and the ground line, and to include a function to attenuate the amplitude of the high-frequency signal superposed on the +B line, and various impedance circuits are usable for the signal attenuation unit 24. As a specific example, usable is a capacitor shown in FIG. 4A, a serially-connected circuit of a capacitor and a resistor, which is shown in FIG. 4B, a serially-connected circuit of a coil and a capacitor, which is shown in FIG. 4C, a parallel-connected circuit of a coil and a capacitor, which is shown in FIG. 4D, a serially-connected circuit of a ferrite bead and a capacitor, which is shown in FIG. 4E, a parallel-connected circuit of a ferrite bead and a capacitor, which is shown in FIG. 4F, a combination of these, or the like. Moreover, a similar effect can be obtained by a circuit other than the above-described ones, in which impedance is lowered at a carrier frequency.

FIGS. 5A and 5B are explanatory views showing the signals expressing "1" and "0" by the ASK modulation in the case of making the data communication between the master station ECU 1 and the slave station ECU 2a. As shown in FIG. 5A, the signal expressing "1" is set to be a carrier signal S in which the amplitude is larger than a predetermined voltage. As shown in FIG. 5B, the signal expressing "0" is set to be a carrier signal S in which the amplitude is smaller than the predetermined voltage.

Figure 6A:
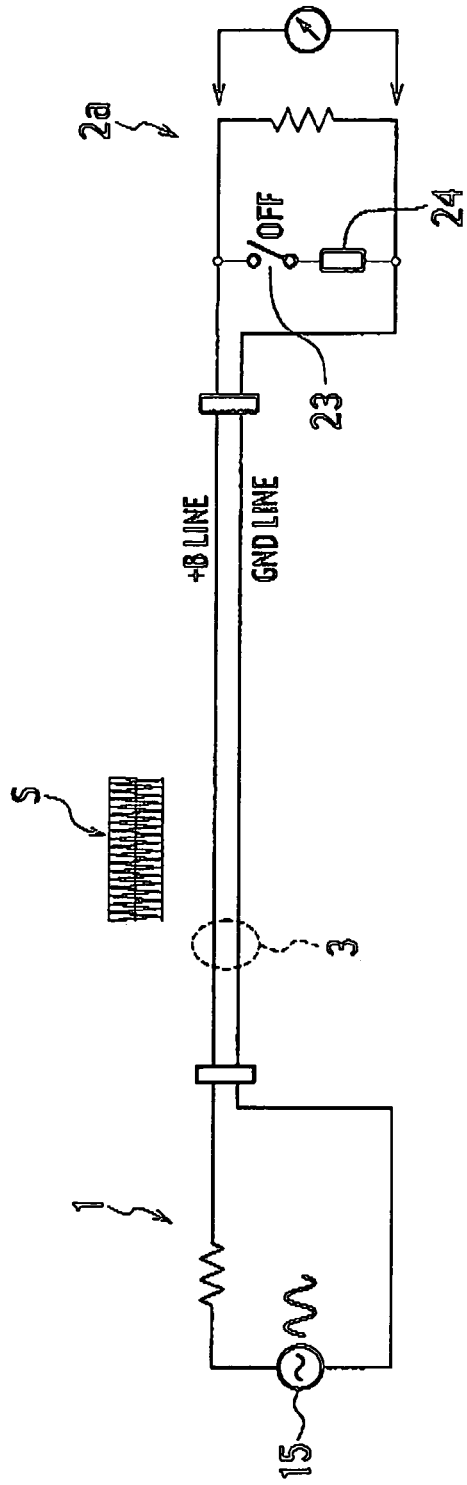
FIGS. 6A and 6B are explanatory views showing the "0" signal and the "1" signal in a case of transmitting data from the master station ECU to the slave station ECU according to the embodiment of the present invention.
Figure 6B:
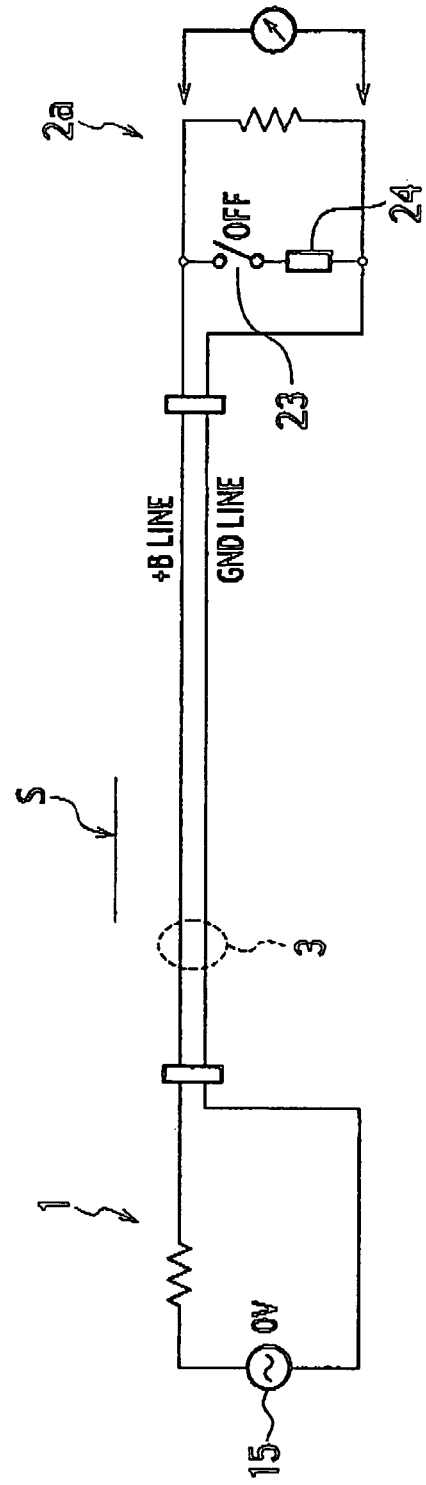

FIGS. 6A and 6B are explanatory views showing the signals expressing "1" and "0" by the ASK modulation in the case of transmitting the data from the master station ECU 1 to the slave station ECU 2a. As shown in FIG. 6A, in the case of transmitting the signal expressing "1" from the master station ECU 1, the amplitude of the carrier signal S outputted from the transmission unit 11 is made larger than a fixed value. Meanwhile, as shown in FIG. 6B, in the case of transmitting the signal expressing "0" from the master station ECU 1, the amplitude of the carrier signal S is set at 0. In such a way, the signals expressing "1" and "0" by the ASK modulation can be transmitted from the master station ECU 1 to the slave station ECU 2a.

FIGS. 7A and 7B are explanatory views showing the signals expressing "1" and "0" by the ASK modulation in the case of transmitting the data from the slave station ECU 2a to the master station ECU 1. As described above, when the data is transmitted by the slave station ECU 2a, the carrier signal S is outputted to the bus line 3 by the master station ECU 1.

Hence, as shown in FIG. 7A, the transmission switch 23 owned by the slave station ECU 2a is switched off, and thus the carrier signal S superposed on the bus line 3 becomes the signal expressing "1" in a state of maintaining the amplitude of the time when being transmitted from the master station ECU 1 without being attenuated, and is transmitted to the master station ECU 1 and other slave stations ECUs (not shown).

On the other hand, as shown in FIG. 7B, when the transmission switch 23 owned by the slave station ECU 2a is switched on, the +B line and the ground line are coupled to each other through the signal attenuation unit 24. Accordingly, the carrier signal S superposed on the bus line 3 is attenuated. In such a way, the "0" signal can be generated.

Specifically, in the slave station ECU 2a, the carrier signal S superposed on the bus line 3 can be ASK-modulated by operating the signal attenuation unit 24 and the transmission switch 23 without providing an oscillator for generating the carrier signal S, and the carrier signal S can be transmitted to the master station ECU 1 and the other slave stations ECUs.

FIGS. 8(a) to 8(e) are timing charts showing transmission and reception timing of the data by the master station ECU 1 and the other slave stations ECUs 2a to 2c. Operations of the ASK communication device according to this embodiment are described while referring to FIG. 8.

In FIGS. 8(a) to 8(e), time bases are shown in a horizontal axis direction. A vertical axis direction in FIG. 8(a) represents amplitude of the carrier signal S superposed on the +B line of the bus line 3. The vertical axis direction in FIG. 8(b) represents the transmission/reception timing in the master station ECU 1. The vertical axis direction of FIGS. 8(c) to 8(e) represent the transmission/reception timing in the respective slave stations ECUs 2a to 2c. Moreover, reference symbols Tx and Rx denote transmission and reception, respectively. For example, reference symbol R1 present on the Tx side of FIG. 8(b) denotes that the data is being transmitted, and reference symbol ID1 present on the Rx side of FIG. 8(c) denotes that ID information is being received. Furthermore, reference symbols TxSW ON/OFF denote on/off of the transmission switch 23. For example, amplitude denoted by reference symbol P1 present on the TxSW side of FIG. 8(c) is expressed to be longer in the vertical direction when the transmission switch 23 is switched on than when the transmission switch 23 is switched off.

An ID of "ID0" is allocated to the master station ECU 1, and IDs of "ID1" to "ID3" are allocated to the slave stations ECUs 2a to 2c, respectively. When an ID signal allocated to a certain slave station ECU is outputted by the master station ECU 1, the data transmission is performed by the slave station ECU concerned.

First, when the ID is the ID0, the data transmission is one by the master station ECU 1. Accordingly, when the transmission data is outputted as denoted by the reference symbol P0 shown in FIG. 8(b), an ASK modulation signal as denoted by reference symbol Q0 of FIG. 8(a) is outputted to the bus line 3. Then, this transmission data is received by the respective slave stations ECUs 2a to 2c.

Subsequently, when a signal representing the ID1 is outputted from the master station ECU 1, it is recognized in the slave station ECU 2a that the data transmission is one by the slave station ECU 2a itself. In this case, the carrier signal S is superposed on the bus line 3 by the master station ECU 1 only during a time slot denoted by reference symbol R1 of FIG. 8(b). Hence, if the transmission switch 23 is switched on and off at timing denoted by reference symbol P1 of FIG. 8(c) when the transmission switch 23 is switched off, the carrier signal S superposed on the bus line 3 is not attenuated as described above, and when the transmission switch 23 is switched on, the carrier signal S superposed on the bus line 3 is attenuated. Accordingly, as a result, the carrier signal S superposed on the bus line 3 can be ASK-modulated by the on/off operations of the transmission switch 23. Specifically, an ASK modulation signal denoted by reference symbol Q1 of FIG. 8(a) can be obtained.

Moreover, this ASK modulation signal is transmitted as the transmission data of the slave station ECU 2a to the master station ECU 1 and the other slave stations ECUs 2b and 2C.

In a similar way, when a signal representing the ID2 is outputted from the master station ECU 1, the carrier signal S superposed on the bus line 3 is modulated by on/off operations (refer to reference symbol P2) of the transmission switch 23 owned by the slave station ECU 2b. In such a way, an ASK modulation signal as denoted by reference symbol Q2 is superposed on the bus line 3, and is transmitted to the master station ECU 1 and the other slave stations ECUs 2a and 2c.

Furthermore, when a signal representing the ID3 is outputted from the master station ECU 1, an ASK modulation signal as denoted by reference symbol Q3 is superposed on the bus line 3, and is transmitted to the master station ECU 1 and the other slave stations ECUs 2a and 2b.

In such a way, it is possible to make the data communication by the ASK modulation among the master station ECU 1 and the respective slave stations ECUs 2a to 2c.

As described above, in the ASK communication device according to this embodiment, the oscillation circuit 15 for outputting the carrier signal S is provided in the master station ECU 1, and in the case of transmitting the data from the master station ECU 1, the carrier signal S is ASK-modulated and outputted to the bus line 3. Meanwhile, in the case of transmitting the data from the slave stations ECUs 2a to 2c, the carrier signal S outputted from the master station ECU 1 to the bus line 3 is ASK-modulated by the on/off operations of the transmission switch 23, and is outputted to the slave stations ECUs and the master station ECU 1. Accordingly, it is not necessary for the respective slave stations ECUs 2a to 2c to include the oscillation circuits.

Hence, the configuration of each of the slave stations ECUs 2a to 2c can be simplified, and it is not necessary to use an expensive oscillation circuit therein. Accordingly, a cost reduction can be achieved.

Figure 9A:
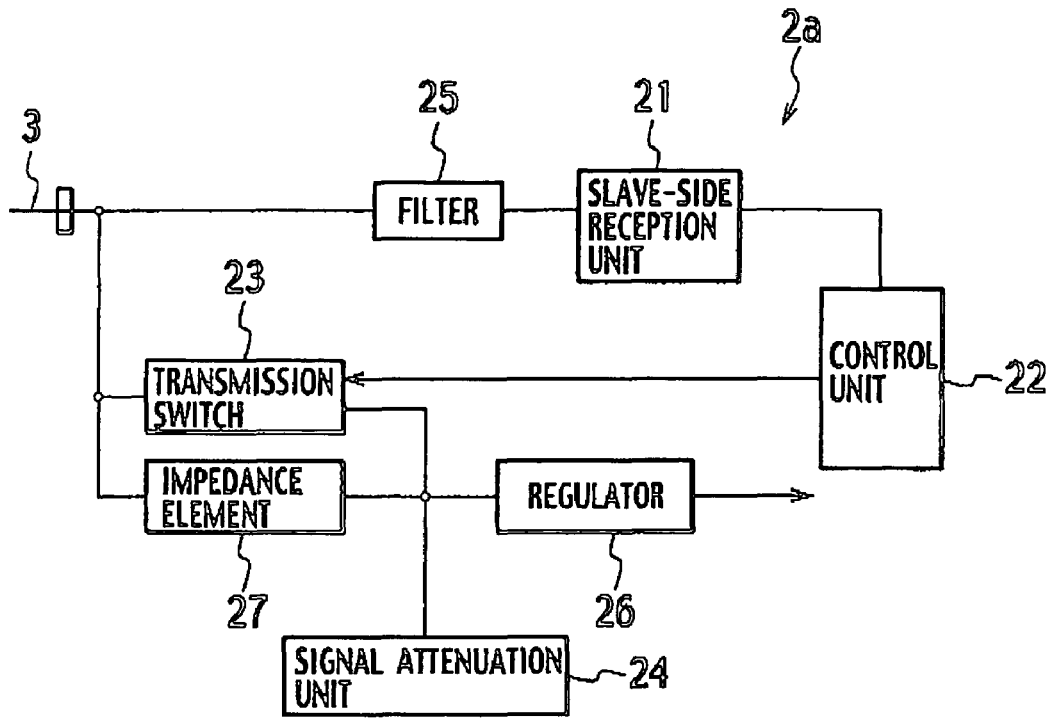
FIGS. 9A and 9B are explanatory views showing a configuration of a modification example of the slave station ECU according to the embodiment of the present invention.
Figure 9B:
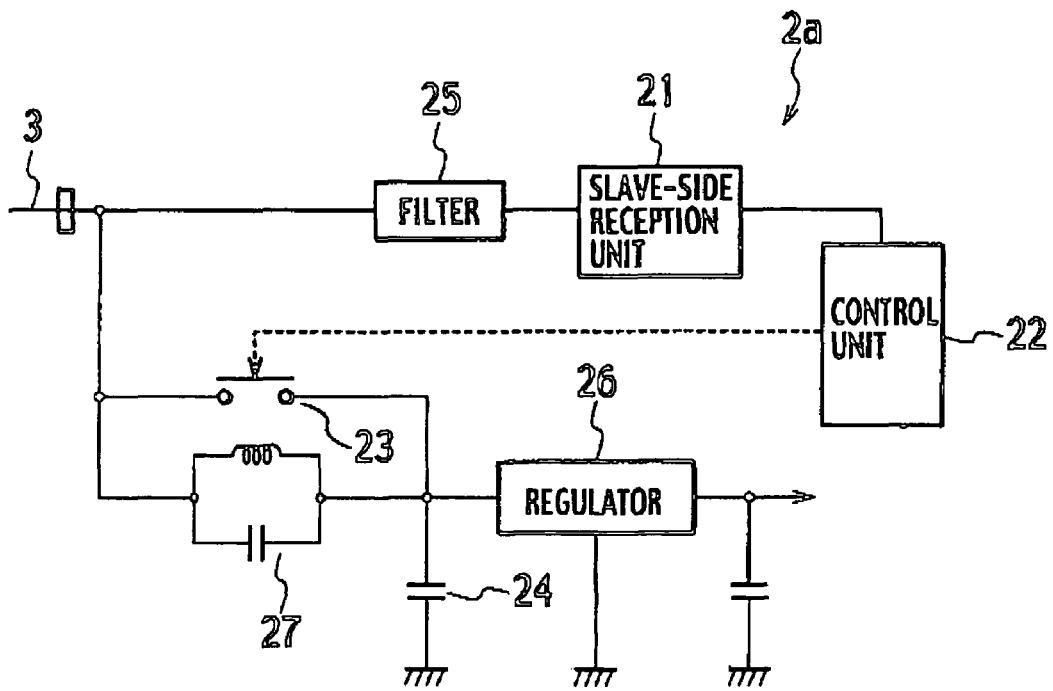

FIGS. 9A and 9B are explanatory views showing a configuration of a modification example of the slave station ECU 2a: FIG. 9A is a block diagram; and FIG. 9H is a circuit diagram. As shown in FIGS. 9A and 9B, in the slave station ECU 2a, an impedance element 27 is provided parallel to the transmission switch 23, and further, a regulator 26 is provided at a connecting point of the transmission switch 23 and the signal attenuation unit 24. As shown in FIG. 9B, the impedance element 27 comprises the parallel-connected circuit of the coil and the capacitor.

With such a configuration, a power supply voltage supplied from the bus line 3 as the power line is supplied to the regulator 26 while the high-frequency signal for use in the ASK communication is being removed by the impedance element 27. Accordingly, the regulator 26 can convert a voltage of, for example, 12V supplied through the power line into a voltage of 5V for use in driving the ECU and loads, and can drive the loads by using the voltage of 5V. Moreover, by operating the transmission switch 23 to be switched on/off, the carrier signal S superposed on the bus line 3 can be ASK-modulated.

Figure 10A:
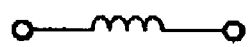
FIGS. 10A to 10E are circuit diagrams showing specific examples of an impedance element of the modification example of the slave station ECU according to the embodiment of the present invention.
Figure 10B:
Figure 10C:
Figure 10D:
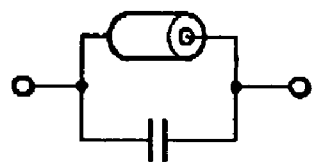
Figure 10E:

Note that the impedance element 27 is not limited to the above-described parallel-connected circuit of the coil and the capacitor. A similar effect can be obtained even by using a coil shown in FIG. 10A, a ferrite bead shown in FIG. 10B, a resistor shown in FIG. 10C, a parallel-connected circuit of a ferrite bead and a capacitor, which is shown in FIG. 10D, a serially-connected circuit of a resistor and a coil, which is shown in FIG. 10E, or a circuit formed by combining these. Moreover, a similar effect can be obtained even by a circuit other than the above-described ones, in which the impedance is increased at the carrier frequency.

Although description has been made above of the ASK communication device based on the illustrated embodiment, the present invention is not limited to this, and configurations of the respective units can be replaced by arbitrary configurations having similar functions.

For example, though description has been made of the case of using the above-described ASK communication device for the power line communication system (PLC apparatus) provided in a vehicle, the present invention is not limited to this, and is also applicable to other purposes.

Moreover, in the above-described embodiment, the example of providing three slave stations ECUs 2a to 2c has been described; however, the present invention is not limited to this, and is also applicable to the case of using one, two, or four or more ECUs.

What is claimed is:

1. An ASK communication device for making data communication among respective stations by using an ASK mode, comprising:

a master station; and at least one slave station connected to the master station through a bus line, wherein the master station comprises:

an oscillation circuit for outputting a carrier signal with a desired frequency;

a transmission unit for ASK-modulating the carrier signal outputted from the oscillation circuit and outputting, to the bus line, ID signals identifying the respective stations and data transmitted to the slave station in a case of transmitting the data from the master station, and outputting the ID signal of the slave station serving as a transmission source and the carrier signal to the bus line in a case of transmitting data from the slave station; and a master-side reception unit for receiving the data transmitted from the slave station through the bus line, and the slave station comprises:

a slave-side reception unit for receiving the data transmitted from the master station and another slave station; and an attenuation unit for attenuating the carrier signal outputted from the master station to the bus line and generating an ASK modulation signal in a case of transmitting the data from the slave station.

2. The ASK communication device according to claim 1, wherein the attenuation unit is formed of a transmission switch and a signal attenuation unit, both of which are connected between two electrical wires constituting the bus line, and the carrier signal superposed on the bus line are switched attenuation and non-attenuation by switching the transmission switch conduction and cutoff.

3. The ASK communication device according to claim 2, wherein the signal attenuation unit comprises at least one of a resistor, a coil, a capacitor, a parallel-connected circuit of a coil and a capacitor, and a serially-connected circuit of a resistor and a coil.

4. The ASK communication device according to claim 1, wherein the bus line is a power line for supplying a power supply voltage to the master station and the slave station.

* * * * *